United States Patent [19]

Kato et al.

[11] Patent Number: 4,641,079
[45] Date of Patent: Feb. 3, 1987

[54] BATTERY VOLTAGE REGULATING SYSTEM

[75] Inventors: Hidetoshi Kato, Suzuka; Fuyuky Maehara, Kariya; Nobuo Mayumi, Oubu, all of Japan

[73] Assignee: Nippondenso Co., Ltd., Kariya, Japan

[21] Appl. No.: 702,380

[22] Filed: Feb. 15, 1985

[30] Foreign Application Priority Data

Feb. 20, 1984 [JP] Japan .................................. 59-31209

[51] Int. Cl.$^4$ .......................... H02J 7/14; H02J 7/24; H02P 9/26; H02P 9/30
[52] U.S. Cl. ....................................... 320/64; 320/48; 322/28; 322/99
[58] Field of Search ...................... 320/48, 64; 322/28, 322/99

[56] References Cited

U.S. PATENT DOCUMENTS

| | | | |
|---|---|---|---|
| 4,315,205 | 2/1982 | Mori et al. | 322/99 |
| 4,316,134 | 2/1982 | Balan et al. | 320/64 X |
| 4,362,982 | 12/1982 | Akita et al. | 320/64 |
| 4,477,766 | 10/1984 | Akita et al. | 320/64 X |

*Primary Examiner*—William B. Perkey
*Attorney, Agent, or Firm*—Cushman, Darby & Cushman

[57] ABSTRACT

The battery voltage regulating system for vehicle use of this invention controls the energization of an alternating-current generator by a generation control circuit responsive to a battery voltage in normal operation. However, if a fault condition such as the damage of a resistor of the generation control circuit or a break in the warning line occurs, and even if the resulting warning is ignored or over-looked by the driver, a warning control circuit provided a requisite control to regulate the generator's generation while giving a warning. In this manner, an average voltage of a battery is kept substantially equal to a predetermined constant value controlled by said generation control circuit even if such unexpected situation occurs. Thus, the battery voltage regulating system can prevent the battery from being excessively charged.

13 Claims, 1 Drawing Figure

BATTERY VOLTAGE REGULATING SYSTEM

BACKGROUND OF INVENTION

1. Field of Invention

The present invention relates to a battery voltage regulating system for vehicle generators, and more particularly to a battery voltage regulating system for controlling the energization of an alternating current generator utilized to supply various electrical loads mounted in a motor vehicle and to charge the motor vehicle's storage battery.

2. Brief Description of Prior Arts

Various types of battery voltage regulating systems are well known in the prior arts. A certain type of such regulating system, as disclosed and claimed in U.S. Pat. No. 4,315,205, comprises a voltage control circuit controlling the energization of a generator in response to the terminal voltage of a battery, a fault detecting circuit for detecting whether the terminal voltage of the battery or the output voltage of the generator is normal so as to generate a fault detection signal when at least one of such voltages is not normal, a change-over circuit responsive to the fault detecting signal to effect the control of the energization of the generator in accordance with the output voltage of the generator instead of said battery terminal voltage; and a warning circuit for giving a warning when the control of power generation is effected in response to the change-over circuit. Therefore, this type voltage regulator can give a warning when the battery is overcharged due to, for example, the damage of a resistor of the voltage control circuit. On the other hand, the driver may still continue driving the car neglecting such warning. Alternatively a fault condition, such as a break in the warning line may occur, making it difficult to become aware of the occurrence of such abnormal condition. Thus, this may result in a shortened life of the battery or cause various bad effects to the electric or electronic devices mounted on the vehicles.

SUMMARY OF INVENTION

With a view to overcoming the aforegoing deficiencies in the conventional voltage regulating system, it is an object of the present invention to provide a battery voltage regulating system for an automotive vehicle wherein even when an unexpected fault condition such as the damage of a resistor in the circuit has occurred and a generation voltage of a generator exceeds a predetermined value, a transistor switching means is forcedly controlled to cut off a current flowing through a field coil of the generator in order to control a battery voltage at value nearly equal to the value of normal operation whilst giving a warning.

The present invention provides a battery voltage regulating system for vehicles including a generator having a armature coils, a field coil and a rectifier for rectifying an AC output from said armature coils, and a battery arranged to be charged by a DC output of said rectifier, the improvement comprising:

a power transistor connected to said field coil of said generator and connected to said generation control circuit for controlling a current flow of a field current flowing through said field coil in response to said resulting output;

a comparator circuit connected to said generator for comparing a generation voltage with at least one reference voltage and for producing an output as a comparison between said generation voltage and said at least one reference voltage;

a transistor circuit connected to said power transistor and connected to said comparator circuit for forcedly holding said power transistor at cut off only when receiving said output from said comparator circuit; and a transistor hysteresis circuit connected to said comparator circuit for detecting whether or not said generation voltage of said generator is a normal level so as to change said at least one reference voltage at one time when said generation voltage of said generator exceeds a predetermined value whereby the energization of power of said generator stops at one time to thereby maintain an average terminal voltage of said battery at value nearly equal to the value of normal operation, thus preventing said battery from being excessively charged.

DETAILED DESCRIPTION OF PREFERRED EMBODIMENT

Figure 1:
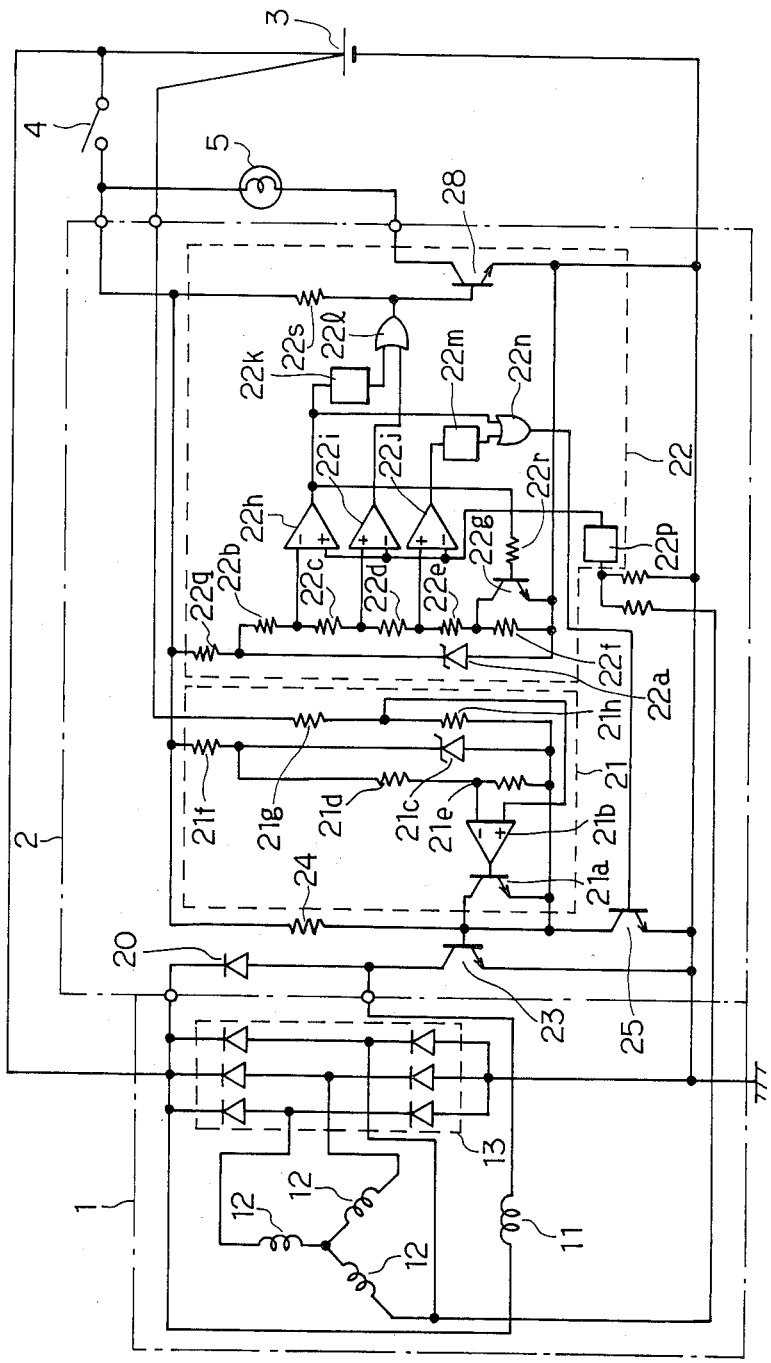
FIG. 1 is an electric wiring diagram of a battery voltage regulating system according to an embodiment of the present invention.

Turning now to FIG. 1, an embodiment of the present invention is shown. In the FIGURE, numeral 1 designates an alternating current generator (hereinafter referred to as a generator) driven by an internal combustion engine. Generator 1 generates a DC current obtained by rectifying a three-phase AC voltage produced at the Y connection of armature coils 12 and by means of a full-wave rectifier 13 connected at one end to a battery 3 and at the other end to ground. In the drawing, numeral 11 designates a field coil for exciting the generator 1, which is connected to the battery 3 at one end. Numeral 2 designates a block showing a control circuit according to the present invention. Numeral 4 designates a key switch, and 5 a charge indicating lamp.

The control circuit 2 will now be described in detail. The control circuit 2 comprises a generation control circuit 21, a warning control circuit 22, a power transistor 23 for switching on and off a current flow in the field coil 11, a fly-wheel diode 20, a resistor 24 and a transistor 25 for switching on and off the base current of the power transistor 23. The field coil 11 and the flywheel diode 20 are connected to the collector of the power transistor 23. The other end of the field coil 11, an output terminal of the rectifier 13 and the cathode of the flywheel diode 20 are connected to the battery 3. The base of the power transistor 23 is connected through the resistor 24 to the key switch 4, and the collector of the transistor 25 is connected to the base of the power transistor 23.

The generation control circuit 21 comprises a transistor 21a and a comparator 21b, and the output of the comparator 21b is connected to the transistor 21a. A reference voltage to be generated by voltage dividing resistors 21d and 21e for dividing a battery voltage by a resistor 21f and a zener diode 21c is inputted to one of the input terminals of the comparator 21b, and a divided battery voltage to be generated by battery voltage dividing resistors 21g and 21h is inputted to the other input terminal of the comparator 21b. The comparator 21b compares the battery voltage with the reference voltage and as the result of such comparison, produces an output signal so that the transistor 21a can selectively be made conductive or nonconductive in response to the output signal.

In the warning control circuit 22, a zener diode 22a is connected in series with a resistor 22q which is connected through the key switch 4 to the battery 3. Between the cathode and anode terminals of the zener diode 22a, resistors 22b to 22f are connected in series. A juncture between the resistors 22b and 22c is connected to an inverting terminal of an excessive voltage detecting comparator 22h, a juncture between the resistors 22c and 22d is then connected to a non-inverting terminal of a generation detecting comparator 22i, and another juncture between the resistors 22d and 22e is connected to a non-inverting terminal of an initial excitation comparator 22j whereby reference voltages for such comparators are made. One end of the armature coil 12 is connected to a smoothing circuit 22p which smooths out a generation voltage of the generator 1 and produces a smoothed output to the other input terminals of the comparators 22h to 22j whereby the aforesaid reference voltages and the smoothed output are compared by those comparators 22h to 22j respectively. An output terminal of the comparator 22h is connected through a resistor 22r to the base of a transistor 22g and is also connected to a lamp drive oscillator 22k. When a non-inverting terminal voltage of the comparator 22h is higher than an inverting terminal voltage of the comparator 22h, the oscillator 22k generates a pulse signal for an OR gate 22l. The output terminal of the comparator 22h is also applied to one of input terminals of an OR gate 22n. Since an output of the comparator 22i is applied to the other input terminal of the OR gate 22l, there is an output if either or both inputs of the OR gate 22l are energized. In addition, an output terminal of the OR gate 22l is connected to the base of a transistor 28 and also connected to a resistor 22s, the other end of which is connected to the key switch 4. Between the collector of the transistor 28 and the key switch 4 is connected the charge indicating lamp 5 for indicating the charge condition in normal operation and for giving a warning by turning on and off when an unexpected situation occurs.

The emitter of the transistor 28 is connected to both the emitter of the transistor 22g and the anode of the zener diode 22a. On the other hand, the other input terminal of the OR gate 22n is connected to an output terminal of the comparator 22j through an oscillator circuit 22m. The oscillator circuit 22m generates an ON-OFF pulse only when a high level signal is inputted, whereby when either or both inputs of the OR gate 22n are energized the OR gate 22n generates such ON-OFF pulse to the transistor 25, the collector of which is connected to the power transistor 23.

With the construction of the above described embodiment, the operation will now be explained. When the key switch 4 is closed, the supply voltage is applied to the various circuits, such as the generation control circuit 21 and the warning control circuit 22. In this case, if the generator 1 is not generating as yet, the smoothing circuit 22p does not generate a signal, and the comparators 22i and 22j receive no signal at the inverting terminals. Thus, the reference voltages inputted to the non-inverting terminals of the comparators 22i and 22j become higher than those at the inverting terminals, and both comparators 22i and 22j generate a high level signal in response. On the other hand, the comparator 22h generates a low level signal because an non-inverting terminal voltage of the comparator 22h is lower than the value of the reference voltage inputted to the inverting terminal of the comparator 22h. Then, in the same manner as explained with respect to the lamp drive oscillator 22k, the oscillator circuit 22m generates an ON-OFF signal, thus turning on and off the transistor 25 in response to such ON-OFF signal, and in accordance with the non-conduction or conduction state of the transistor 25, the transistor 23 is thereby turned on and off, thus switching on and off a current flow through the field coil 11 for excitation, causing the generator 1 to be excited initially. Consequently, at this time, even if the key switch 4 is kept closed for a long time, the present invention prevents the battery 3 from exhausting as rapidly by supplying an excitation current intermittently flowing through the field coil 11. At this time, with the output level of the comparator 22i being high, irrespective of whether the output level of the lamp drive oscillator 22k is high or low, there is an output signal at the output of the OR gate 22e, whereby energizing the transistor 28 to light the charge indicating lamp 5. At this time, the comparator 21b produces no signal causing the transistor 21a to be eventually cut off. A non-inverting terminal voltage of the comparator 21b is lower than its inverting terminal voltage since the battery voltage is still low, leading to the transistor 31a being off.

Thereafter, when the engine starts operating so that the generator 1 starts the generation of power, the excitation current flows through the field coil 11 and a generation voltage is developed across the armature coils 12. Thereafter, when the smoothed output of the smoothing circuit 22p connected to the armature coil 12 becomes higher than the reference voltage of the comparator 22j, the output of the comparator 22j goes from the high level to the low level. Because the comparator 22h is also generating a low level signal at this time, the OR gate 22n will be forced from the high level to the low level and the transistor 25 is turned off. At this time, with the transistor 23 being kept heavily conductive, the excitation current also flows continuously, (in a full-excitation state) then the generation voltage of the generator 1 goes higher whereby the battery 3 can be charged by the DC current from the rectifier 13. Thereafter, an increase of the engine rotation, causes the generation voltage of the generator 1 also increase. When the smoothed output of the smoothing circuit 22p becomes higher than the reference voltage of the comparator 22i, the output of the comparator 22i goes low. Although the comparator 22h is generating a low level signal at this time, the output of the OR gate 22 is forced low, this causing the transistor 28 to turn off. Accordingly, the charge indicating lamp 5 also turns off. On the other hand, the transistor 25 is still kept in a nonconducting state. Thereafter, when the battery voltage increases as the battery 3 is charged by the DC current of the generator 1, the non-inverting terminal voltage of the comparator 21b will eventually become higher than a reference voltage inputted to the inverting terminal of the comparator 21b according to the increase of the battery voltage the comparator 21b generates a high level signal in response to hold the transistor 21a in conduction whereby the transistor 23 is driven from conductor to cutoff, so that no current flows through the field coil 11 at all. Consequently, the generation voltage of the generator 1 decreases and the battery voltage also decreases. Thereafter, after this time, when the non-inverting terminal voltage of the comparator 21b becomes lower than the reference voltage always inputted to the inverting terminal of the comparator 21b will, the comparator 21b generate a low level signal to make the transistor 21a non-conductive. This forward-biases a base-emitter junction, allowing the transistor 23 to conduct. Thereafter, this process, as explained above, is performed repeatedly so as to regulate the battery voltage at a predetermined value by turning on and off the transistor 23. In this condition, when the generator 1 is generating normally, the battery voltage is substantially kept at such predetermined value by the repetition of the above operation.

If any abnormal situation (for example, the damage of a resistor of the generation control circuit 21) occurs which results in the battery voltage exceed the predetermined value by the increase of the generation voltage of the generator 1, the smoothed output of the smoothing circuit 22p also increases. When this smoothed output (also an input to the non-inverting terminal of the comparator 22h) becomes higher than its reference voltage, the comparator 22h goes to a high state (as a fault detecting signal). However, at this time, the output of the comparators 22i and 22j become low level as the non-inverting terminal voltages of the comparators 22i and 22j are higher than the reference voltages of those comparators inverting inputs due to the aforesaid increase of the battery voltage so that the lamp drive oscillator 22k generates an ON-OFF signal. This incoming ON-OFF signal switches on and off the transistor 28, causing the charge indicating lamp 5 to turn on and off at a constant frequency with the same duty ratio, so the driver can learn that the battery 3 is becoming overcharged. At the same time, the high level output signal of the comparator 22h also forward-biases a base-emitter junction of the transistor 22g in order to turn it on, so that voltage between the collector and emitter (also being voltage across the resistor 22f) becomes almost zero, and the transistor 22g behaves like a closed pair of switch contacts. Accordingly, the reference voltage at the inverting terminal of the comparator 22h becomes a lower value. The high level output of the comparator 22h turns on the OR gate 22n, causing the transistor 25 to conduct, so that the power transistor 23 is held at cutoff. In this condition, the excitation current does not flow at all through the field coil 11, and as a result, the generation voltage of the generator 1 decreases. In this instance, the transistor 23 can be kept in nonconduction until a time when the smoothed output of the smoothing circuit 22p becomes lower than the once lowered reference voltage appearing at the inverting terminal of the comparator 22h by the conduction of the transistor 22g. By this function of the present invention, the battery voltage regulating system can regulate an average voltage of the battery 3 at value nearly equal to the predetermined set value of the normal operational condition, thus preventing the battery 3 from being over-charged.

In addition to advantages described above, this battery voltage regulating system according to the invention is designed so that, as shown by the embodiment, the generation control circuit 21 and the warning control circuit 22 may be monolithic ICs which are independent from each other, therefore, if any fault condition occurs in either the generation control circuit 21 or the warning control circuit 22, the danger of such damage to the other monolithic IC can be avoided.

According to the embodiment described above, the battery voltage regulating system of the invention has advantages that when any fault condition occurs, such as damage to a resistor in the circuit, causing the generator 1 to generate excessively high voltage, this system gives a warning to the driver, and even in case the warning is ignored or neglected by the driver, or the driver has overlooked such warning, or even when a break in the warning line occurs, this battery voltage regulating system automatically regulates the battery voltage at value nearly equal to the predetermined set value of the normal operational condition. Further, the system can avoid any damage to the battery 3 and the resulting bad effects to the electronic devices mounted on the vehicle because the battery 3 can be prevented from being excessively charged.

What we claim is:

1. In a battery voltage regulating system for a vehicle including a generator having armature coils which produces a generation voltage, a field coil, a rectifier for rectifying an AC output from said armature coils, and a battery arranged to be charged by a DC output of said rectifier, the improvement comprising:

generation control means, including a comparator connected to said battery, for comparing a battery voltage with a substantially constant voltage and producing a resulting output indicative thereof;

power transistor means connected to said field coil of said generator and to said generation control means, for controlling a current flow of a field current flowing through said field coil in response to said resulting output;

comparator means, connected to said generator, for comparing said generation voltage with at least one of lower and higher reference voltages and for producing an output as a comparison between said generation voltage and said at least one of said lower and higher reference voltages;

transistor means, connected to said power transistor means and to said comparator means, for forcedly holding said power transistor means in a cut off state when receiving a first output from said comparator means and holding said power transistor means in a turned on state when receiving a second output from said comparator means; and controlling means for controlling said transistor means, connected to said comparator means, and for detecting whether said generation voltage of said generator is within a normal range of levels to change said higher reference voltage to said lower reference voltage at a first time when said generation voltage of said generator exceeds a predetermined value proportional to said higher reference voltage, an energization of power of said generator stopping at said first time and remaining off until a second time at which said generation voltage of said generator returns to a predetermined value proportional to said lower reference voltage, said lower reference voltage being changed to said higher reference voltage at said second time and the energization of power of said generator again starts at said second time to thereby maintain an average terminal voltage of said battery at value substantially equal to the value of normal operation, thus preventing said battery from being excessively charged.

2. In a battery voltage regulating system for a vehicle including a generator having armature coils which produces a generation voltage, a field coil and a rectifier for rectifying an AC output from said armature coils, and a battery arranged to be charged by a DC output of said rectifier, the improvement comprising:

generation control means, including a comparator connected to said battery, for comparing a battery voltage with a constant voltage and producing a resulting output indicative thereof;

power transistor means, connected to said field coil of said generator and to said generation control means, for controlling a current flow of a field current flowing through said field coil in response to said resulting output;

a reference voltage means including a plurality of dividing resistors connected in series, for generating first, second and third reference voltages at junctures between said dividing resistors, said first reference voltage being higher than said second reference voltage which is yet higher than said third reference voltage;

first comparator means for comparing said generation voltage of said generator with said first reference voltage and producing a first signal when said generation voltage of said generator becomes higher than said first reference voltage;

second comparator means for comparing said generation voltage of said generator with said second reference voltage and producing a second signal when said generation voltage of said generator becomes lower than said second reference voltage;

third comparator means for comparing said generation voltage of said generator with said third reference voltage and producing a third signal when said generation voltage of said generator becomes lower than said third reference voltage;

first logic means having a first oscillator connected to said first comparator means, an output terminal of said first oscillator generating an ON-OFF pulse only when receiving said first signal, and a first OR gate, both inputs of said first OR gate connected to said first oscillator and said second comparator means respectively, said first logic means for providing a warning only when at least one of the inputs of said first OR gate are energized;

second logic means having a second oscillator connected to said third comparator means, an output terminal of said second oscillator generating an ON-OFF pulse only when receiving said third signal, and a second OR gate, both inputs of said second OR gate connected to said oscillator and said first comparator means respectively, said second logic curcuit for outputting said output to said transistor circuit only when at least one of the inputs of said second OR gate are energized;

transistor means, connected to said power transistor means and to said comparator means for forcedly holding said power transistor in a cut off state when receiving said output from said comparator means; and control means connected to said comparator means for detecting whether said generation voltage of said generator is at a normal level, to change said at least one reference voltage at one time when said generation voltage of said generator exceeds a predetermined value, whereby the energization of power of said generator stops at another time, to thereby maintain an average terminal voltage of said battery at value nearly equal to the value of normal operation, thus preventing said battery from being excessively charged.

3. A battery voltage regulating system according to claim 2, said comparator circuit further comprising:
a smoothing circuit connected to one end of one of said armature coils for smoothing out said generation voltage, said smoothed generation voltage being supplied to said first through third comparator means.

4. A battery voltage regulating system according to claim 3 wherein said generation control circuit is made from a first monolithic IC independent from a second monolithic IC consisting of said comparator and transistor hysterisis circuits.

5. In a system for regulating a battery voltage in a vehicle including a generator having armature coils which produces a generation voltage, a field coil and a rectifier for rectifying an AC output from said armature coils, and a battery arranged to be charged by a DC output of said rectifier, the improvement comprising:

first means connected to said battery for comparing said battery voltage with a substantially constant voltage and for producing a resulting output indicative thereof;

second means connected to said field coil of said generator for controlling a current flow of a field current flowing through said field coil in response to said resulting output;

third means connected to said second means for forcedly holding said second means at a cutoff state irrespective of said resulting output from said first means;

fourth means connected to said generator for comparing said generation voltage of said generator with at least one reference voltage and for controlling said third means in accordance with said comparison between said generation voltage and said at least one reference voltage; and fifth means for detecting whether said generation voltage of said generator is within a normal range of levels to change a one reference voltage toward another reference voltage lower than said one reference voltage when said generation voltage of said generator is outside of said normal range of levels to thereby maintain said generation voltage of said generator within a range of predetermined values proportional to said one reference voltage and said another reference voltage to prevent said battery from being excessively charged.

6. A system as in claim 1 further comprising:
a generator having armature coils, which produces a generation voltage;
a field coil;
rectifier means for rectifying an AC output from said armature coils into DC voltage; and
a battery arranged to be charged by said DC output.

7. A system for regulating a voltage on a battery, using generator means for producing a generation voltage at an output terminal thereof, comprising:
first control means for comparing said battery voltage with a first reference, and for selectively enabling said generator means based on such comparing;
means for producing a second reference which is alterable between a first value and a second value;
second control means for comparing said generation voltage with said second reference, and for
  (1) when said generation voltage is greater than said first value of said second reference:

(a) altering said second reference to said second value, and (b) disabling said first control means and selectively enabling and disabling said generator to maintain said battery voltage within a predetermined range of said second reference to prevent overcharging; and (2) when said generation voltage is lower than said second value of said second value of said second reference:

(a) altering said second reference to said first value, and (b) enabling said generator to keep said battery voltage from falling too low.

8. A system as in claim 7 further comprising generator means for producing a generation voltage at an output terminal thereof.

9. A system as in claim 8 wherein said system is for use in a motorized vehicle.

10. A system as in claim 8 wherein said second control means includes smoothing means for producing a DC voltage sample indicative of said generation voltage.

11. A system as in claim 10 wherein said second control means further comprises:

first, second, and third comparator means for comparing an input voltage with a reference voltage;

first, second, third and fourth resistor means coupled to one another in series for forming a resistive ladder, one end of said resistive ladder being coupled to said second reference so that reference voltages proportional to said second reference are produced at junctures between said first, second, third and fourth resistor means, said other reference voltages being coupled to said reference voltage inputs of said first, second and third comparator means, respectively.

12. A system as in claim 11 further comprising switching means coupled across said fourth resistor means for selectively shorting out said fourth resistor means.

13. A method for regulating a voltage on a battery, using generator means for producing a generation voltage at an output terminal thereof, comprising the steps of:

comparing the battery voltage with a first reference;

selectively enabling said generator means based on such comparing;

producing a second reference which is alterable between a first value and a second value;

comparing said generation voltage with said second reference, and (1) when said generation voltage is in a first relation with said first value of said second reference:

(a) altering said second reference to said second value, and (b) disabling said first control means and selectively disabling said generator means; and (2) when said generation voltage is in a second relation to said second value of said second value of said second reference:

(a) altering said second reference to said first value, and (b) enabling said generator means.

* * * * *